June 30, 1925.  E. STEINER  1,543,957
TRELLISING HOOK
Filed March 27, 1924
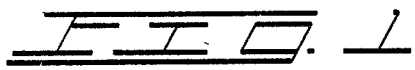
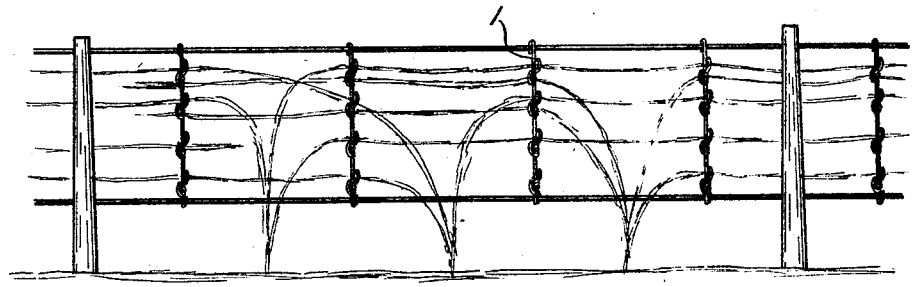
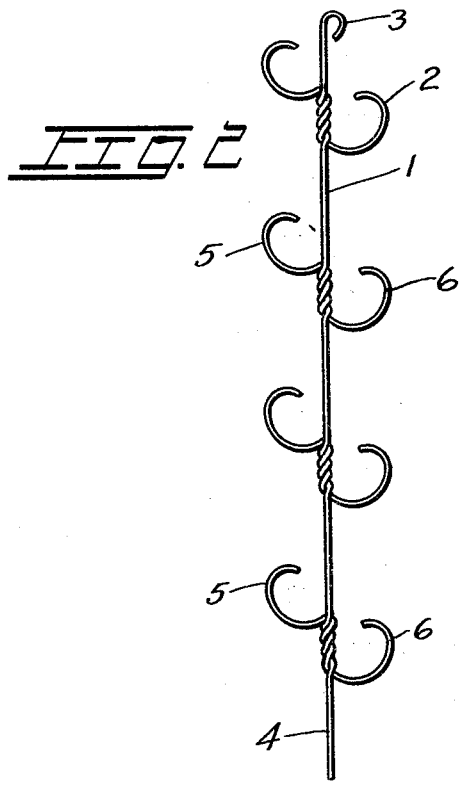
INVENTOR
Edward Steiner
ATTORNEY Patented June 30, 1925.

1,543,957

UNITED STATES PATENT OFFICE.

EDWARD STEINER, OF AUBURN, WASHINGTON.

TRELLISING HOOK.

Application filed March 27, 1924. Serial No. 702,178.

*To all whom it may concern:*

Be it known that I, EDWARD STEINER, a citizen of the United States, and residing at Auburn, in the county of King and State of Washington, have invented a new and useful Trellising Hook; and I do hereby declare that the following is a full, clear, and exact specification, such as will enable others skilled in the art to which it appertains to make and use the same.

The invention is a simple, economical, and efficient device for supporting vines or the like.

The object of the invention is to provide a device for supporting vines or the like in which the vines may be readily placed.

Another object of the invention is to provide a device for supporting vines or the like which is of a very simple and economical construction.

And a further object of the invention is to provide a means for supporting vines or the like which may be readily installed.

Other features and advantages of the invention will be seen from the following description taken in connection with the drawings, wherein:—

Figure 1 is a view showing the device as it would appear in use.

Figure 2 is a view showing the device in detail.

In the drawings I have shown my device as it would be made wherein numeral 1 indicates the main stem and numeral 2 the hook-shaped members.

The main stem 1 may be made of a straight piece of wire or other suitable material with a hook 3 at the upper end and the lower end 4 straight as shown so that it may be bent around the lower horizontal member as shown in Figure 1. The hook-shaped members 2 which are bent to form hooks 5 and 6 at each end are attached to the main member 1 by twisting the two members together. It will be seen that the main member 1 is twisted as well as the member 2 so that the member 2 will be rigidly held in place. This will form a rigid connection without the use of bands, rivets, or solder.

It will be understood that changes may be made in the construction without departing from the spirit of the invention. One of such changes may be in the design of the hook; another may be in the placing of a greater or lesser number of the hooks on the main member; and still another may be in the means of attaching the main member to a frame or holding it in place.

The construction will be readily understood from the foregoing description. To use the device a frame consisting of two horizontal wires may be placed on posts in a row of vines or the like and the device attached to the horizontal members by hooks at the upper and lower ends as shown in Figure 1. The hook at the lower end is formed as the device is placed on the frame so that the distance between the members of the frame may vary. When these members are in place the vines may be trained along the frame by placing them in the hooks as shown in Figure 1. It will be seen that each member of the vines may be placed in an individual hook and as the vine grows the member may be continued to other hooks in the same line. However, it is understood the members of the vine may be carried up and down from one row of hooks to another if desired.

Having thus fully described the invention, what I claim as new and desire to secure by Letters Patent, is:—

A device of the class described comprising double hook-shaped members attached to and extending from a main stem, each hook-shaped member embodying two hooks formed of one piece of material having its central portion connected to the main stem by twisting both the hook-shaped member and the stem; and suitable means at the ends of the main stem for attaching it to other supporting means.

EDWARD STEINER.